US010778960B2

(12) United States Patent
Grenier et al.

(10) Patent No.: US 10,778,960 B2
(45) Date of Patent: *Sep. 15, 2020

(54) AERIAL VEHICLE SENSOR POSITIONING

(71) Applicant: Amazon Technologies, Inc., Seattle, WA (US)

(72) Inventors: Taylor David Grenier, Seattle, WA (US); Louis Leroi LeGrand, III, Seattle, WA (US); Barry James O'Brien, Seattle, WA (US); Joshua John Watson, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,820

(22) Filed: Nov. 15, 2018

(65) Prior Publication Data

US 2019/0104297 A1 Apr. 4, 2019

Related U.S. Application Data

(63) Continuation of application No. 15/265,793, filed on Sep. 14, 2016, now Pat. No. 10,165,256.

(51) Int. Cl.
*H04N 13/243* (2018.01)
*H04N 5/247* (2006.01)
(Continued)

(52) U.S. Cl.
CPC .......... *H04N 13/243* (2018.05); *B64C 27/20* (2013.01); *B64C 27/26* (2013.01);
(Continued)

(58) Field of Classification Search
None
See application file for complete search history.

(56) References Cited

U.S. PATENT DOCUMENTS 10,165,256 B2 * 12/2018 Grenier ................ H04N 5/247
2003/0085999 A1    5/2003 Okamoto et al.
(Continued)

FOREIGN PATENT DOCUMENTS

CN    105775151 A    7/2016
CN    107428413 A    12/2017
(Continued)

OTHER PUBLICATIONS

International Search Report & Written Opinion for PCT/US2017/051084, dated Jun. 5, 2018, 13 pages.
(Continued)

*Primary Examiner* — Eileen M Adams
(74) *Attorney, Agent, or Firm* — Athorus, PLLC

(57) ABSTRACT

Described is an aerial vehicle, such as an unmanned aerial vehicle ("UAV"), that includes a plurality of sensors, such as stereo cameras, mounted along a perimeter frame of the aerial vehicle and arranged to generate a scene that surrounds the aerial vehicle. The sensors may be mounted in or on winglets of the perimeter frame. Each of the plurality of sensors has a field of view and the plurality of optical sensors are arranged and/or oriented such that their fields of view overlap with one another throughout a continuous space that surrounds the perimeter frame. The fields of view may also include a portion of the perimeter frame or space that is adjacent to the perimeter frame.

23 Claims, 6 Drawing Sheets

(51) Int. Cl.
   *B64C 39/02* (2006.01)
   *B64D 47/08* (2006.01)
   *H04N 13/239* (2018.01)
   *B64C 29/00* (2006.01)
   *B64C 27/26* (2006.01)
   *B64C 27/20* (2006.01)

(52) U.S. Cl.
   CPC ........ *B64C 29/0025* (2013.01); *B64C 39/024* (2013.01); *B64D 47/08* (2013.01); *H04N 5/247* (2013.01); *H04N 13/239* (2018.05); *B64C 2201/027* (2013.01); *B64C 2201/127* (2013.01); *H04N 2213/001* (2013.01)

(56) References Cited

U.S. PATENT DOCUMENTS

| | | | | |
|---|---|---|---|---|
| 2013/0162838 | A1* | 6/2013 | Huang | H04N 7/181 348/169 |
| 2015/0367957 | A1 | 12/2015 | Uskert et al. | |
| 2016/0021312 | A1 | 1/2016 | Kim et al. | |
| 2016/0029008 | A1 | 1/2016 | Prechtl | |
| 2016/0176343 | A1 | 6/2016 | Sakano et al. | |
| 2016/0375997 | A1 | 12/2016 | Welsh et al. | |
| 2017/0197713 | A1* | 7/2017 | Borman | A47L 5/12 |
| 2017/0341776 | A1* | 11/2017 | McClure | B64D 47/08 |
| 2017/0363949 | A1* | 12/2017 | Valente | H04N 13/344 |

FOREIGN PATENT DOCUMENTS

| | | |
|---|---|---|
| JP | 2003204547 A | 7/2003 |
| JP | 2007221179 A | 8/2007 |
| JP | 2010288060 A | 12/2010 |
| WO | 2015029934 A1 | 3/2015 |
| WO | 2015195886 A1 | 12/2015 |
| WO | 2016140987 A1 | 9/2016 |

OTHER PUBLICATIONS

Search Report dated Dec. 3, 2019, for corresponding CN Application No. 201780056672.6.

* cited by examiner

US 10,778,960 B2

AERIAL VEHICLE SENSOR POSITIONING

PRIORITY CLAIM

This application is a continuation of U.S. patent application Ser. No. 15/265,793, filed Sep. 14, 2016 and entitled Aerial Vehicle Optical Sensor Configuration, which is hereby incorporated by reference in its entirety.

BACKGROUND

Optical sensors have been used on unmanned aerial vehicles (UAVs) to measure or capture images of space around the aerial vehicle. For example, cameras have been used to detect objects around UAVs. Measuring space around UAVs with optical sensors has traditionally been limited by the range of the optical sensors, the geometries of the UAVS and mounts for optical sensors, and the amount of optical sensors on a UAV.

Mounting optical sensors at traditional mounting locations on UAVs, such as on a gimbal below the frame of the UAV, results in spaces around the UAV that cannot be measured or "blind spots." For example, if sensors are mounted from a structure extending directly above or below the middle of the UAV, blind spots may be present near the UAV, above or below the sensors, and/or above or below the UAV. Blind spots are undesirable because an object in a blind spot cannot be detected.

Blind spots may be reduced by mounting additional optical sensors that are directed toward the blind spots; however, adding an optical sensor and its corresponding wiring and mounting hardware increases the weight of the UAV. In addition, mounting optical sensors can increase the drag and otherwise negatively impact flight, takeoff, and/or landing performance. Also, adding additional optical sensors and their mounting hardware can create additional blind spots. In addition, adding sensors to a UAV may increase the computing resources, and relatedly, the power, that is required to process the data provided by the sensors.

BRIEF DESCRIPTION OF THE DRAWINGS

The detailed description is set forth with reference to the accompanying figures. In the figures, the left-most digit(s) of a reference number identifies the figure in which the reference number first appears.

Figure 1:
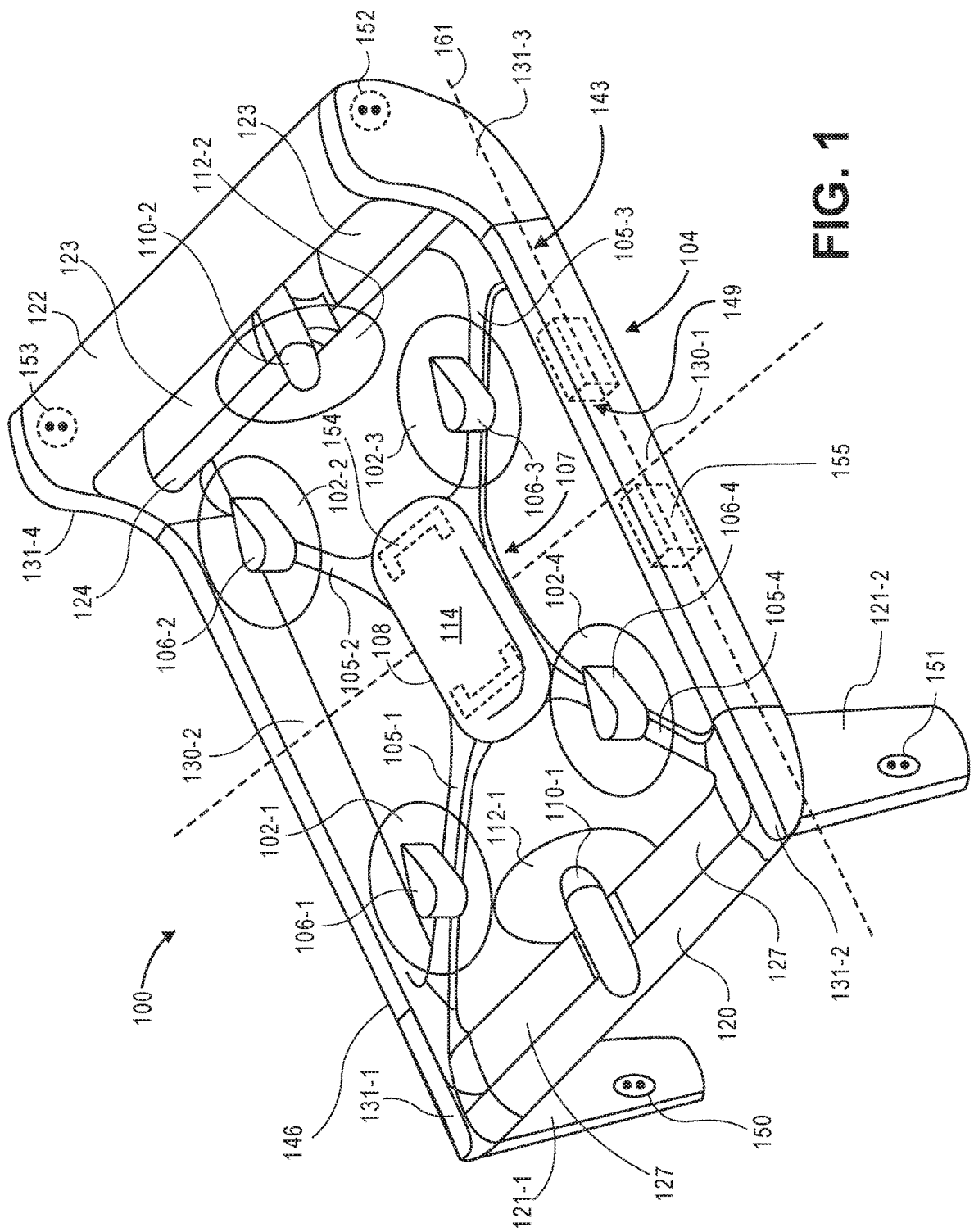
FIG. 1 depicts a view of an aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." As used herein, the term "coupled" may refer to two or more components connected together, whether that connection is permanent (e.g., welded) or temporary (e.g., bolted), direct or indirect (i.e., through an intermediary), mechanical, chemical, optical, or electrical. As used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors. As used herein in connection with angles, "approximately" means within +/−10 degrees.

DETAILED DESCRIPTION

This disclosure describes a configuration of an aerial vehicle, such as an unmanned aerial vehicle ("UAV"), having a plurality of sensors, such as optical sensors, cameras, etc., located along a perimeter frame of the aerial vehicle. The sensors may be attached to winglets or other structures of the perimeter frame. Each sensor may include a stereo camera that is oriented or arranged in a configuration around a perimeter of the aerial vehicle such that an edge of a field of view of the stereo camera is adjacent, parallel, and/or encompasses a portion of the perimeter frame of the aerial vehicle. Likewise, the field of view of each stereo camera of the configuration overlaps with a field of view of at least one other stereo camera of the configuration. In some implementations, a horizontal alignment of a field of view of the stereo cameras is offset with respect to a direction of travel. The configurations disclosed herein may provide for a scene to be generated that represents a continuous space that surrounds (e.g., horizontally or vertically) the aerial vehicle using as few as four sensors. The configurations disclosed herein may provide for an outer surface of the perimeter frame or space close to an outer surface of the perimeter frame of the aerial vehicle to be included within the fields of views of the sensors, which may provide for detection of objects at spaces close to the aerial vehicle and reduced blind spots.

FIG. 1 illustrates a view of an aerial vehicle 100 according to an implementation. In some implementations, the aerial vehicle 100 is a UAV. As illustrated, the aerial vehicle 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear right corner junction 131-3, and the rear left corner junction 131-4. In such implementations, the corner junctions are part of the perimeter frame 104.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the aerial vehicle 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the aerial vehicle 100 when the UAV is moving in one or more directions. For example, the wings may each have an airfoil shape that causes lift due to the airflow passing over the wings during horizontal flight.

Opposing ends of the front wing 120 may be coupled to a corner junction 131, such as the front right corner junction 131-2 and front left corner junction 131-1. In some implementations, the front wing may include one or more flaps 127 (or "ailerons"), that may be capable of adjusting the pitch, yaw, and/or roll of the aerial vehicle 100 alone or in combination with the lifting motors 106, lifting propellers 102, thrusting motors 110, thrusting propellers 112, and/or other flaps on the rear wings, discussed below. In one or more implementations, the flaps 127 may be used as a protective shroud to further hinder access to the lifting propellers 102 by objects external to the aerial vehicle 100. For example, when the aerial vehicle 100 is moving in a vertical direction or hovering, the flaps 127 may be extended to increase a size of a protective barrier around a portion of the lifting propellers 102.

In some implementations, the front wing 120 may include two or more pairs of flaps 127, as illustrated in FIG. 1. In other implementations, for example, if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may control the pitch, yaw, and/or roll of the aerial vehicle 100 during flight.

Opposing ends of the lower rear wing 124 may be coupled to a corner junction 131, such as the rear right corner junction 131-3 and rear left corner junction 131-4. The rear right corner junction 131-3 and the rear left corner junction 131-4 may be winglets. In some implementations, the lower rear wing may include one or more flaps 123, that may adjust the pitch, yaw and/or roll of the aerial vehicle 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the aerial vehicle 100. For example, when the aerial vehicle 100 is moving in a vertical direction or hovering, the flaps 123 may be extended, similar to the extending of the front flaps 127 of the front wing 120.

In some implementations, the rear wing 124 may include two or more flaps 123, as illustrated in FIG. 1 or two or more pairs of flaps, respectively. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear right corner junction 131-3 and rear left corner junction 131-4. In some implementations, like the lower rear wing 124, the upper rear wing 122 may include one or more flaps (not shown) or ailerons, that may adjust the pitch, yaw and/or roll of the aerial vehicle 100 alone or in combination with the lifting motors 106, lifting propellers 102, thrusting motors 110, thrusting propellers 112, and/or other flaps of other wings (not shown). In some implementations, the flaps may be capable of forming a protective shroud that may hinder access to the lifting propellers 102 by objects external to the aerial vehicle 100. When the aerial vehicle 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the aerial vehicle while the aerial vehicle 100 is moving in a horizontal direction. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts with the vertical lift vectors of the lower rear wing 124 and the upper rear wing 122, providing efficiency, stabilization and control.

In some implementations, to further increase the stability and control of the aerial vehicle 100, one or more winglets 121, or stabilizer arms, may also be coupled to and included as part of the perimeter frame 104. In the example illustrated regarding FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and horizontal side rails 130. Likewise, the two rear corner junctions 131-3, 131-4 are also formed and operate as winglets providing additional stability and control to the aerial vehicle 100 when the aerial vehicle 100 is moving in a horizontal direction.

The winglets 121 and the rear corner junctions 131-3, 131-4 may have dimensions that are proportional to the length, width, and height of the aerial vehicle 100 and may be positioned based on the approximate center of gravity of the aerial vehicle 100 to provide stability and control to the aerial vehicle 100 during horizontal flight. In one implementation, the aerial vehicle 100 may be approximately 64.75 inches long from the front of the aerial vehicle 100 to the rear of the aerial vehicle 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the aerial vehicle 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. In some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a lifting motor 106 to an upper side of each motor arm 105, another lifting motor may also be mounted to an underneath side of each motor arm 105 and oriented in a downward direction. In another implementation, the central frame 107 may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the aerial vehicle 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the aerial vehicle 100 and any payload engaged by the aerial vehicle 100 so that the aerial vehicle 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the aerial vehicle 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the aerial vehicle 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the aerial vehicle. For example, fans, jets, turbojets, turbo fans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the aerial vehicle 100 and utilized to increase the efficiency of flight that includes a horizontal component. For example, when the aerial vehicle 100 is traveling in a horizontal direction, the thrusting motors may be engaged to provide a horizontal thrust force via the thrusting propellers to propel the aerial vehicle 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the aerial vehicle 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the aerial vehicle 100 with two thrusting motors 110 and corresponding thrusting propellers 112, in other implementations, there may be fewer or additional thrusting motors and corresponding thrusting propellers. For example, in some implementations, the aerial vehicle 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the aerial vehicle 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the perimeter frame 104.

The perimeter frame 104 may protect the aerial vehicle 100 from foreign objects by inhibiting access to the lifting propellers 102 from the side of the aerial vehicle 100 and may increase the structural integrity of the aerial vehicle 100. If the aerial vehicle 100 is traveling horizontally and collides with a foreign object (e.g., wall, building), the impact between the aerial vehicle 100 and the foreign object will be with the perimeter frame 104, rather than a propeller. Likewise, because the perimeter frame 104 is interconnected with the central frame 107, the forces from the impact are dissipated across both the perimeter frame 104 and the central frame 107.

The perimeter frame 104 also provides a structure from which one or more components of the aerial vehicle 100 may be mounted on or in. Alternatively, or in addition thereto, one or more components of the aerial vehicle 100 may be mounted or positioned within the cavity of the portions of the perimeter frame 104. For example, one or more antennas may be mounted on or in the front wing 120. The antennas may transmit and/or receive wireless communications. For example, the antennas may be utilized for Wi-Fi, satellite, near field communication ("NFC"), cellular communication, or any other form of wireless communication. Other components, such as optical sensors (e.g., cameras), time of flight sensors, accelerometers, inclinometers, distance-determining elements, gimbals, Global Positioning System (GPS) receiver/transmitter, radars, illumination elements, speakers, and/or any other component of the aerial vehicle 100 or the aerial vehicle control system (discussed below), etc., may likewise be mounted to or in the perimeter frame 104. Likewise, identification or reflective identifiers may be mounted to the perimeter frame 104 to aid in the identification of the aerial vehicle 100.

In some implementations, the perimeter frame 104 may also include a permeable material (e.g., mesh, screen) that extends over the top and/or lower surface of the perimeter frame 104 enclosing the central frame 107, lifting motors 106, and/or lifting propellers 102.

An aerial vehicle control system 114 is also mounted to the central frame 107. In this example, the aerial vehicle control system 114 is mounted to the hub 108 and is enclosed in a protective barrier. The protective barrier may provide the control system 114 weather protection so that the aerial vehicle 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the aerial vehicle 100 includes one or more power modules 155. In some implementations, the power modules 155 may be positioned inside the cavity of the side rails 130-1, 130-2. In other implementations, the power modules 155 may be mounted or positioned at other locations of the UAV. The power modules 155 for the UAV may be in the form of battery power, solar power, gas power, super capacitor, fuel cell, alternative power generation source, or a combination thereof. For example, the power modules 155 may each be a 6000 mAh lithium-ion polymer battery, or polymer lithium ion (Li-poly, Li-Pol, LiPo, LIP, PLI or Lip) battery. The power module(s) are coupled to and provide power for the aerial vehicle control system 114, the lifting motors 106, the thrusting motors 110, the optical sensors 150, and the payload engagement mechanism 154.

In some implementations, one or more of the power modules 155 may be configured such that it can be autonomously removed and/or replaced with another power module while the UAV is landed or in flight. For example, when the UAV lands at a location, the UAV may engage with a charging member at the location that will recharge the power module.

As mentioned above, the aerial vehicle 100 may also include a payload engagement mechanism 154. The payload engagement mechanism 154 may be configured to engage and disengage items and/or containers that hold items (payload). In this example, the payload engagement mechanism 154 is positioned beneath and coupled to the hub 108 of the perimeter frame 104 of the aerial vehicle 100. The payload engagement mechanism 154 may be of any size sufficient to securely engage and disengage a payload. In other implementations, the payload engagement mechanism 154 may operate as the container in which it contains item(s). The payload engagement mechanism 154 communicates with (via wired or wireless communication) and is controlled by the aerial vehicle control system 114. Example payload engagement mechanisms are described in U.S. Pat. No. 9,573,684, filed Sep. 30, 2014, titled "UNMANNED AERIAL VEHICLE DELIVERY SYSTEM," the subject matter of which is incorporated by reference herein in its entirety.

A first optical sensor 150, a second optical sensor 151, a third optical sensor 152, and a fourth optical sensor 153 are coupled (or "secured," "attached," "mounted," etc.) to the perimeter frame 104. The first optical sensor 150 and the second optical sensor 151 are coupled to the front left corner junction 131-1 and the front right corner junction 131-2, respectively. As discussed in more detail with respect to FIG. 2A, the first optical sensor 150 may be secured to the winglet 121-1 and may protrude (or "extend") away from the inner side of the winglet 121-1. The second optical sensor 151 may be secured to the winglet 121-2 and protrude away from an outer side of the winglet 121-2. The third optical sensor 152 may be mounted to the rear right corner junction 131-3 and may protrude away from an outer side of the rear right corner junction 131-3. The fourth optical sensor 153 may be mounted to the rear left corner junction 131-4 and protrude from an inner side of the rear left corner junction 131-4. In other implementations, sensors may be at other locations, such as wings (e.g., front wing 120, upper wing 122), flaps (e.g., flap 123, 127). For example, a plurality of sensors may be mounted or secured to a single winglet.

The first optical sensor 150 and the second optical sensor 151 are located at a bottom portion 143 of the aerial vehicle 100, and the third optical sensor 152 and the fourth optical sensor 153 are located at a top portion 149 of the aerial vehicle 100. The bottom portion 143 of the aerial vehicle 100 is a portion of the perimeter frame 107 that is below a horizontal centerline 161. The top portion 149 of the aerial vehicle 100 is a portion of the perimeter frame 107 above the horizontal centerline 161.

The optical sensors 150, 151, 152, and 153 may include various types of sensors such as single lens cameras, stereo cameras, multi-lens cameras, digital still cameras, red, green, blue (RGB) cameras, video cameras, thermographic cameras, infrared sensors, and light detection and ranging (LIDAR). As used herein, "optical sensor" includes sensors capable of converting light into electrical signals that are representative or indicative of an object included in the field of view of the optical sensor. In some implementations, one or more optical sensors may include or be replaced with other types of sensors, for example, sound navigation and ranging (SONAR) sensors that may be used. In general, as used herein, "sensor" includes any sensor that is capable of detecting or generating, or being used to detect or generate, a representation of an object located in a field of view of the optical sensor.

In some implementations, the optical sensor includes a stereo camera with two or more imaging elements that are capable of being used together to capture or obtain images of three-dimensional space. As used herein, "imaging element" refers to a device used to record or capture image data or data that may be used to generate an image. For example, an imaging element may include an optical instrument, such as a digital camera. In another example, an imaging element includes a lens used to pass light to a sensor and/or detector. In some implementations, a stereo camera has a separate image sensor, detector, or film frame for each lens. In some examples, a single sensor may be used in combination with multiple lenses of a stereo camera.

The first optical sensor 150, the second optical sensor 151, the third optical sensor 152, and the fourth optical sensor 153 each may have an angle of view. As used herein, "angle of view" refers to an angle through which a detector of an optical sensor is sensitive to electromagnetic radiation. In one or more implementations, the angles of view may be adjustable. For example, the angles of view may be adjustable by the aerial vehicle controller 114. Angles of view may be measured horizontally, vertically, or diagonally. In some implementations, the optical sensors 150, 151, 152, and 153 may have horizontal angles of view that are at least 110 degrees and vertical angles of view that are greater than 60 degrees. In some implementations, the optical sensors 150, 151, 152, and 153 may have horizontal angles of view that are each at least 100 degrees. In other implementations, the optical sensors 150, 151, 152, and 153 may have horizontal angles of view that are between 90 and 100 degrees. In some implementations, optical sensors 150, 151, 152, and 153 have angles of view that are substantially the same. In other implementations, the angle of view of at least one optical sensor on the aerial vehicle is different from the angles of view of other optical sensors on the aerial vehicle. The angles of view of optical sensors 150, 151, 152, and 153 may be selected based on the shape of the aerial vehicle 100 or a location on the perimeter frame of each respective optical sensor, for example.

The first optical sensor 150, the second optical sensor 151, the third optical sensor 152, and the fourth optical sensor 153 each may have a field of view. As used herein, "field of view" refers to space in the observable world that may be measured (or "sensed") at a time using the optical sensor. The field of view of an optical sensor may depend on a location and an orientation of the optical sensor with respect to the vehicle. The field of view of an optical sensor may also depend on the angle of view of the optical sensor. For a stereo camera, each imaging element may have a field of view, and the stereo camera may have a combined field of view. Unless otherwise indicated from the context, the "field of view" of a stereo camera refers to the common field of view that this is defined by common or overlapping portions of one or more fields of view of the imaging elements of the stereo camera.

For a camera sensor, such as a stereo camera, the angle of view and field of view may depend on one or more properties of the imaging elements of the stereo camera. For example, the focal lengths of lenses of the imaging elements may determine the angle of view of the stereo camera. In some implementations, the field of view of a stereo camera and the angle of view of the stereo camera may be proportional to one another. For example, an optical sensor with a larger angle of view may have a larger field of view compared to an optical sensor with a comparatively smaller angle of view.

The optical sensors 150, 151, 152, and 153 may be arranged such that the respective field of view of each optical sensor 150, 151, 152, and 153 overlaps with the field of view of another one of optical sensor 150, 151, 152, and 153 along the perimeter frame. In some implementations, the optical sensors 150, 151, 152, and 153 are arranged such that the field of view of each optical sensor 150, 151, 152, and 153 overlaps with the fields of view of two other optical sensors of the optical sensors 150, 151, 152, and 153. For example, the field of view of the first optical sensor 150 and the field of view of the second optical sensor 151 may have an overlap, and the field of view of the first optical sensor 150 and the fourth optical sensor 153 may have a different overlap. In addition, the field of view of the second optical sensor 151 and the field of view of the third optical sensor 152 may have another, different overlap. The field of view of the third optical sensor 152 and the field of view of the fourth optical sensor 153 may have yet another, different overlap.

As discussed below with respect to FIG. 5, optical sensors 150, 151, 152, and 153 may communicate with and be controlled by control system, and signals from optical sensors 150, 151, 152, and 153 may include images or may be used to obtain images. In some implementations, these images may be processed to generate depth information, such as disparity and displacement, for objects included in the scene. The optical sensors 150, 151, 152, and 153 may be coupled to the control system 114, for example, via wires running through the front left corner junction 131-1, the front right corner junction 131-2, the rear right corner junction 131-3, and the rear left corner junction 131-4, respectively. To reduce drag caused by the wires and/or to protect the wires, some or all of the wires may be located within cavities or space within the perimeter frame, such as within corner junctions 131. In some implementations, the optical sensors 150, 151, 152, and 153 and the control system 114 include wireless transmitter/receiver modules such that the optical sensors 150, 151, 152, and 153 and the control system 114 may communicate wirelessly.

As discussed in more detail below with respect to FIGS. 2A, 2B, 3, and 5, signals provided by optical sensors 150, 151, 152, and 153 may be used to generate a scene that is representative of a continuous space that horizontally surrounds the perimeter frame 104. In some implementations, the scene may provide a 360-degree view of space surrounding the aerial vehicle 100 in a vertical, horizontal, or other angle plane surrounding the aerial vehicle using as few as four cameras. For example, signals from only optical sensors 150, 151, 152, and 153 may define a combined field of view that may be used by the control system 114 to generate a scene representative of continuous space that horizontally surrounds the aerial vehicle 100.

Figure 2A:
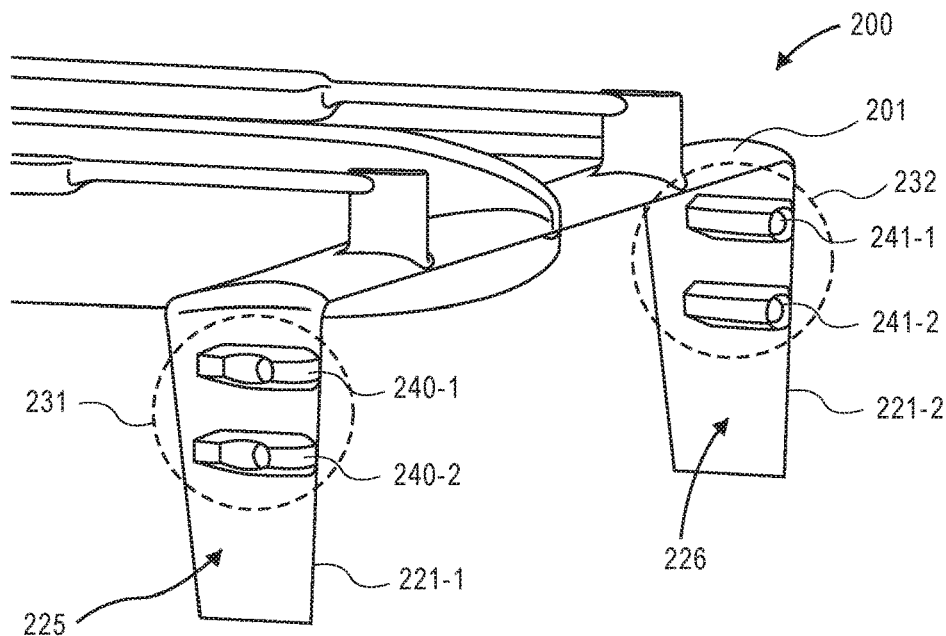
FIGS. 2A and 2B depict views of optical sensors mounted to front and rear winglets of an aerial vehicle, respectively, according to an implementation.

FIG. 2A depicts a partial view of a front portion 200 of an aerial vehicle, such as the aerial vehicle 100 discussed above with respect to FIG. 1. The front portion 200 includes a portion of a perimeter frame 201. As discussed above with respect to FIG. 1, a winglet 221-1 and a winglet 221-2 may be coupled to and included as part of the portion of the perimeter frame 201 of the aerial vehicle. In this example, a first optical sensor 231 is attached to an outward facing portion 225 of the winglet 221-1, and a second optical sensor 232 is attached to an inward facing portion 226 of the winglet 221-2. "Inward" and "outward" may be with respect to the aerial vehicle.

In some implementations, the first optical sensor 231 and the second optical sensor 232 may be embedded (or "set") inside the winglets 221-1 and 221-2, respectively. For example, a portion of optical sensors 231 and 232 may be located within a cavity or inner space of the winglets 221, and/or coupled to an interior portion of the winglets 221. In other implementations, a portion of sensors (e.g. optical sensors 231 and 232) may be embedded in another structure or housing of the perimeter frame such as a wing, flap, or corner junction, etc.

Embedding portions of the optical sensors 231 and 232 in structures included in or attached to the perimeter frame can provide various benefits. For example, embedding optical sensors 231 and 232 into the winglets 221-1 and 221-2 may reduce "dead spots" due to obstructions because such embedding may reduce the overall footprint of the aerial vehicle. In addition, locating imaging elements, such as lenses, for example, of the optical sensors 231 and 232 near exterior surfaces of the winglets 221 may allow the sensors to measure space close to the vehicle. Likewise, the low profile formed by embedding portions of the optical sensors 231, 232 into the perimeter frame may reduce drag produced from the optical sensors 231, 232 during operation of the aerial vehicle, thereby reducing overall power consumption requirements of the aerial vehicle. Further, embedding the optical sensors 231, 232 into structures of the perimeter frame 201 may allow for compatibility with different shaped optical sensor packages.

In some implementations, the optical sensors 231 and 232 are mounted on an outer surfaces of the perimeter frame 201 (e.g., winglets 221). Mounting the optical sensors 231 and 232 to the outer surface of the perimeter frame may be utilized for optical sensors with relatively small footprints that have minimal impact on aerial vehicle operation or blind spots. Also, mounting or locating optical sensors 231 and 232 on outer surfaces of the perimeter frame may require fewer modifications to an existing perimeter frame design.

Still referring to FIG. 2A, the first optical sensor 231 includes a stereo camera having a first imaging element 240-1 and a second imaging element 240-2 that may protrude away from the outward facing portion (or "side") 225 of the winglet 221-1. The second optical sensor 232 includes a stereo camera having a first imaging element 241-1 and a second imaging element 241-2 that may protrude away from the inward facing portion 226 of the winglet 221-2. For example, in implementations that utilize stereo cameras, a portion of the optical sensors 231 and 232, such as lenses of imaging elements 240-1, 240-2, 241-1, and 241-2, protrude up to ⅜ inch away from an exterior surface of the winglets 221.

In some implementations, imaging elements 241-1, and 241-2 (e.g., lenses) may be located proximate to outer edges of the winglets 221-1 to minimize "blind spots" caused by the winglets 221 and/or other parts of the perimeter frame 201. For example, in some implementations, a portion (e.g., a lens) of the optical sensors 231 and/or 232 may be located within ⅝ inch of a leading or trailing edge of the winglets 221. In some implementations, a portion of the optical sensor 231 is within ⅝ of an inch of a trailing edge of winglet 221-1, and a portion of the optical sensor 232 is within ⅝ of an inch of a trailing edge of winglet 221-2.

The first imaging element 240-1 and the second imaging element 240-2 of the first optical sensor 231 are vertically offset or spaced above and below with respect to one another along the winglet 221-1. In other implementations, the first imaging element 240-1 and the second imaging element 240-2 may be horizontally offset, or spaced side to side, with respect to one another. Likewise, the first imaging element 241-1 and the second imaging element 241-2 of the second optical sensor 232 may be horizontally offset with respect to one another.

Vertically or horizontally offset imaging elements may be selected due to, for example, a form factor or shape of a package of the stereo camera and/or a shape of the aerial vehicle, such as a shape of a housing, structure, and/or frame to which the imaging elements are attached. In other implementations, pairs of imaging elements may be offset in other directions with respect to one another. For example, the first imaging element 240-1 may be offset at any angle between a horizontal offset and a vertical offset with respect to the position of the second imaging element 240-2 of the first optical sensor 231.

In addition, the desired fields of view of the stereo cameras may influence whether horizontally or vertically offset stereo cameras are used. For example, the location of "blind spots" or areas where the fields of view of the imaging elements of the stereo camera do not overlap (i.e., are not common), may depend on whether the imaging elements are offset vertically or horizontally.

A spacing or distance between imaging elements of a stereo camera, also referred to as a baseline distance, may be adjusted depending on the intended use of the stereo camera. For example, increasing the baseline distance between stereo cameras may provide improved depth sensing capabilities moving away from the cameras. In comparison, decreasing the baseline distance between the two imaging elements of the stereo pair potentially improves depth sensing capabilities near the aerial vehicle.

The aerial vehicle may be asymmetrical due to the shape, location, orientation, and/or weight of the optical sensors. For example, as discussed above with respect to FIG. 2A, the first optical sensor 231 may protrude away from an outward facing portion 225 of the winglet 221-1, and the second optical sensor 232 may protrude away from in inward facing portion 226 of the winglet 221-2. Such asymmetries may be compensated for during aerial navigation by trimming a rudder, altering the rotational speed of one or more motors of the aerial vehicle, etc.

Figure 2B:
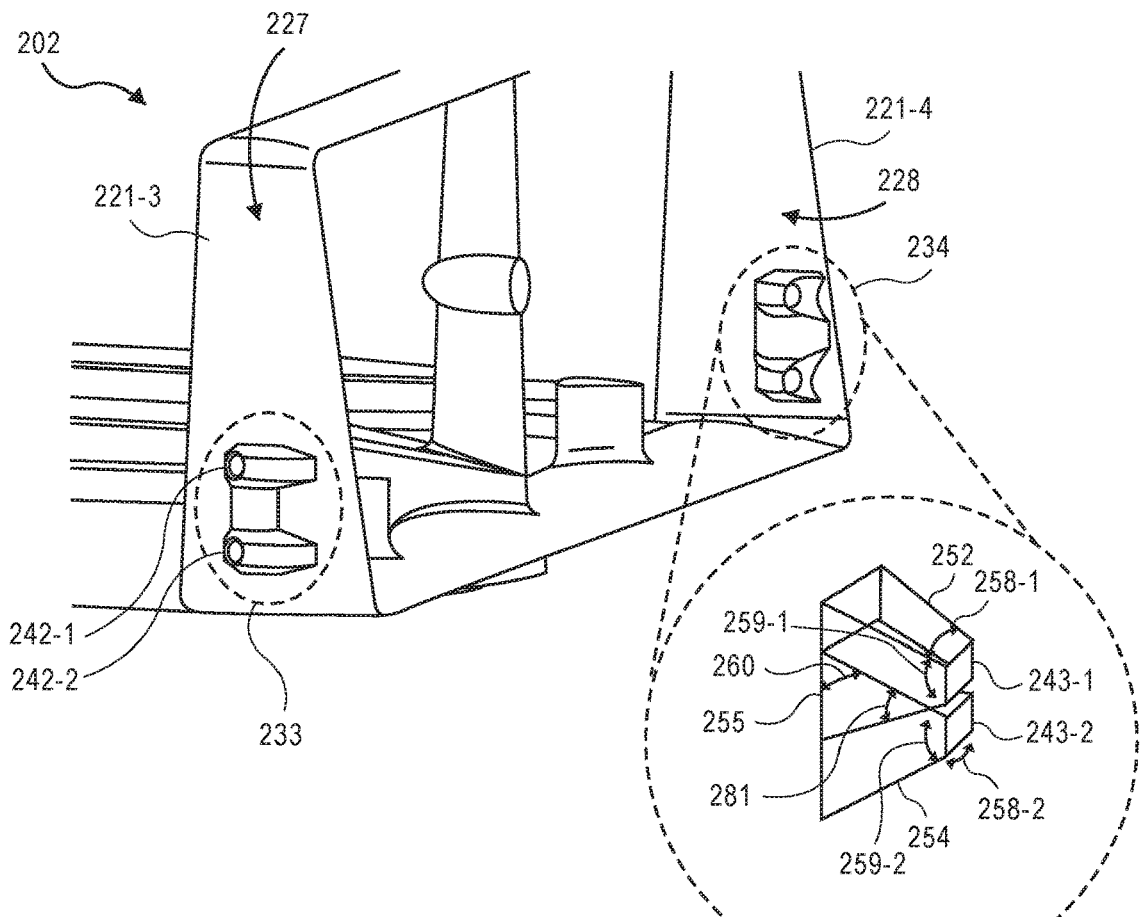

FIG. 2B depicts a partial view of a rear portion 202 of an aerial vehicle, such as the aerial vehicle 100 discussed above with respect to FIG. 1. The rear portion 202 includes a third optical sensor 233 and a fourth optical sensor 234 that are mounted to the perimeter frame 201. The third optical sensor 233 protrudes away from an outer side 227 of the third winglet 221-3 and the fourth optical sensor 234 protrudes away from an inner side 228 of the fourth winglet 221-4 of the perimeter frame 201. The third optical sensor 233 is a stereo camera that includes a first imaging element 242-1 and a second imaging element 242-2 that are vertically offset. The fourth optical sensor 234 is a stereo camera that includes a first imaging element 243-1 and a second imaging element 243-2 that are vertically offset. It will be understood that the above discussions with respect to FIG. 2A may be applicable to the third optical sensor 233 and the fourth optical sensor 234 of FIG. 2B, however, for the sake of brevity, these discussions will not be repeated.

The first imaging element 243-1 of the fourth optical sensor 234 has a first field of view 252, and the second imaging element 243-2 has a second field of view 254. The first imaging element 243-1 has a horizontal angle of view 258-1 and a vertical angle of view 259-1. The second imaging element 243-2 has a horizontal angle of view 258-2 and a vertical angle of view 259-2. The fourth optical sensor 234 has a field of view 255 that is defined by an overlapping or a common portion of the first field of view 252 and the second field of view 254. The fourth optical sensor 234 has a horizontal angle of view 260 and a vertical angle of view 281. It will be understood that the angles of view and fields of view of optical sensors 231 and 232 of FIG. 2A and the third optical sensor 233 may be similar to the angles of view and fields of view discussed above in connection with the fourth optical sensor 234.

In implementations where the horizontal angles of view 258-1 and 258-2 are approximately equal, the horizontal angle of view 260 for the fourth optical sensor 234 is approximately equal to the horizontal angles of view 258-1 and 258-2. Similarly, if the vertical angles of view 259-1 and 259-2 are approximately equal, the vertical field of view 281 for the fourth optical sensor 234 is approximately equal to the vertical angles of view 259-1 and 259-2. In some implementations, optical sensors 233 and 234 may have angles of view of at least 90 degrees. In some implementations, the angle of view is approximately (e.g. +/−10%) an amount of sensors used divided by 360 degrees. In some implementations, the optical sensors 233 and 234 each have angles of view in one direction (e.g., horizontal) of at least 100 degrees or at least 90 degrees and angles of view in another direction (e.g., vertical) of at least 60 degrees.

Optical sensors having particular angles of view may be selected to for desired overlap between fields of view of optical sensors mounted to the aerial vehicle. Excess overlap in fields of view beyond what is necessary to combine or stitch images together can be undesirable because such overlap may cause focus and distortion. Such overlap may increase the computing resources that are required to process the signals output by the optical sensors.

Figure 3:
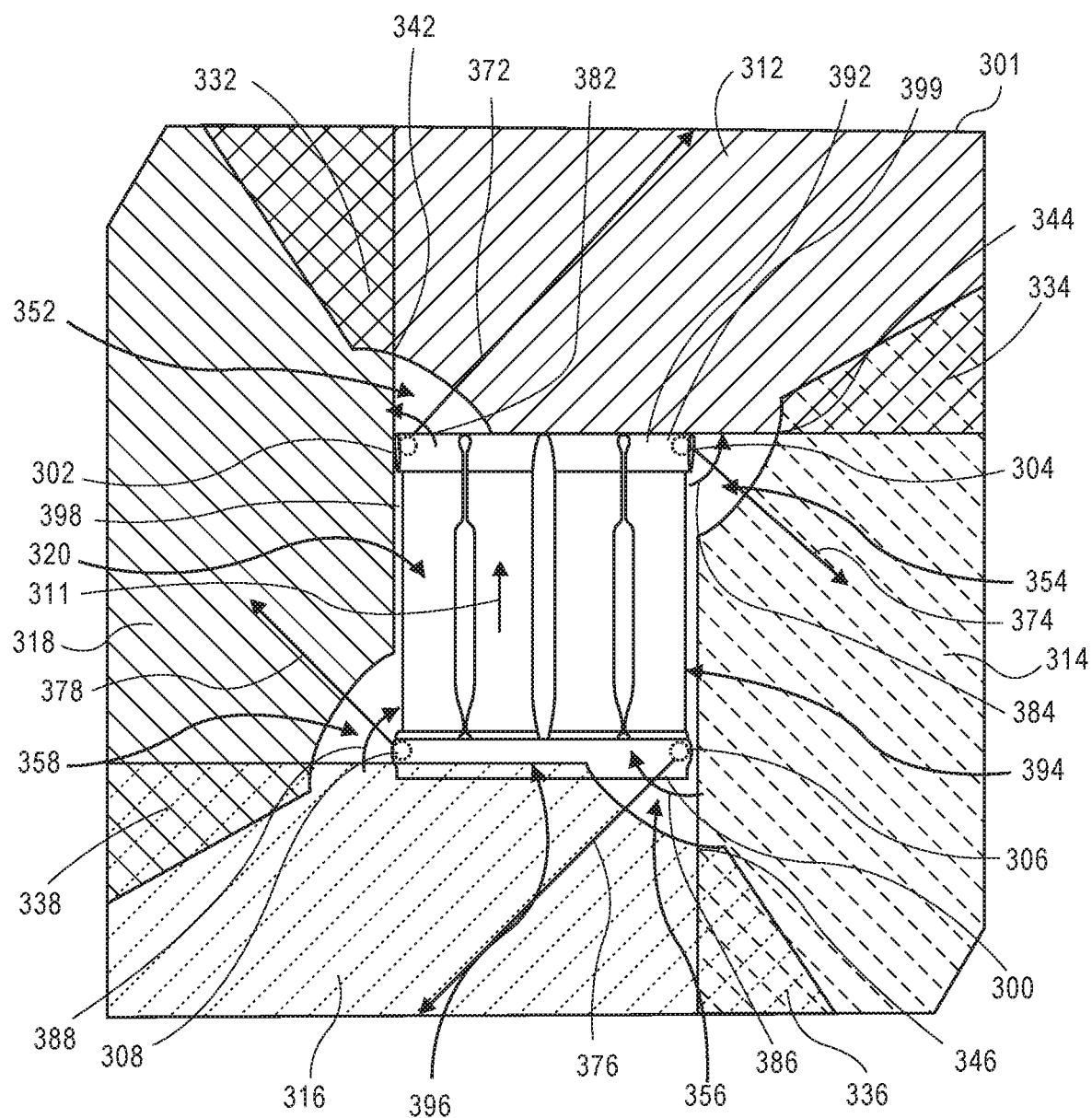
FIG. 3 depicts a view of a plurality of optical sensors and a continuous space that horizontally surrounds an aerial vehicle, according to an implementation.

FIG. 3 depicts an overhead-view of an aerial vehicle 300, in accordance with an implementation. The aerial vehicle 300 includes a perimeter frame 399 that includes a front 392, a first side 394, a rear 396, and a second side 398. In this example, the perimeter frame 399 is rectangular-shaped, but other sizes and shapes are possible. The aerial vehicle 300 also has a middle region 320 that may be located within the front 392, the first side 394, the rear 396 and the second side 398. For example, the middle region 320 may correspond to a region defined by a radius (e.g., 5 inches) extending away from a center of mass or a center of volume of the aerial vehicle 300.

The aerial vehicle 300 includes a first optical sensor 302, a second optical sensor 304, a third optical sensor 306, and a fourth optical sensor 308. The optical sensors 302, 304, 306, and 308, in this example, are stereo cameras. The first optical sensor 302 and the second optical sensor 304 may be secured or coupled to the front 392, and the third optical sensor 306 and the fourth optical sensor 308 may be secured or coupled to the rear 396. In one or more implementations, the front 392, the first side 394, the second side 398, or rear 396 may include one or more structures that house or support the optical sensors 302, 304, 306, or 308, such as winglets wings, flaps, junctions, etc.

The first optical sensor 302, the second optical sensor 304, the third optical sensor 306, and the fourth optical sensor 308 may have a first field of view 312, a second field of view 314, a third field of view 316, and a fourth field of view 318, respectively. The first optical sensor 302, the second optical sensor 304, the third optical sensor 306, and the fourth optical sensor 308 have a first horizontal angle of view 382, a second horizontal angle of view 384, a third horizontal angle of view 386, and a fourth horizontal angle of view 388, respectively.

A combined field of view 301 that includes fields of view 312, 314, 316, and 318 may include a continuous space that horizontally surrounds the perimeter frame 399 of the aerial vehicle 300. Blinds spots 352, 354, 356, and 358 refer to regions between the optical sensors 302, 304, 306, and 308 and the fields of view 312, 314, 316, and 318 where depth may not be sensed using a single stereo camera of the optical sensors 302, 304, 306, and 308. For example, blind spots 352, 354, 356, and 358 may correspond to space where the fields of the view of imaging elements of the stereo cameras are not common, i.e., they do not overlap.

Sensing depth for a location using a stereo camera may require that the imaging elements have overlapping or common fields of view. In some implementations, depth may be capable of being sensed in the blind spots 352, 354, 356, and 358 using a combination of signals output from adjacent optical sensors, such as 302 and 304. As discussed above with respect to FIG. 2A, the size of blind spots 352, 354, 356, and 358 may be adjusted or modified by using different types of sensors or adjustable sensors or reducing the baseline distance between the imaging elements of a stereo camera.

The optical sensors 302, 304, 306, and 308 are aligned in directions indicated by the arrows 372, 374, 376, and 378 such that fields of view 312, 314, 316, and 318 extend horizontally around the perimeter frame 399 of the aerial vehicle 300, as illustrated. Likewise, each optical sensor 302, 304, 306, and 308 is aligned (or "oriented") such that at least a portion of each adjacent field of view, such as the first field of view 312 and the second field of view 314, at least partially overlap, as illustrated by an overlapping region (or "portion") 334. In one or more implementations, the second field of view 314 of the second optical sensor 304 overlaps with the third field of view 316 of the third optical sensor 306 as illustrated by an overlapping region 336, the third field of view 316 of the third optical sensor 306 overlaps with the fourth field of view 318 of the fourth optical sensor 308, as illustrated by an overlapping region 338, and the fourth field of view 318 also overlaps with the first field of view 312, as illustrated by an overlapping region 332. Points 342, 344, 346, and 348 illustrate origins of the overlapping regions 332, 334, 336, and 338. As illustrated in FIG. 3, points 342, 344, 346, and 348 are horizontally separated away from the perimeter (e.g. perimeter frame 399) of the aerial vehicle and may be outside or not within the perimeter of the aerial vehicle. In some implementations, the points 342, 344, 346, and 348 are horizontally separated away from the perimeter frame 399 by at least ½ inch.

In one or more examples, each of optical sensors 302, 304, 306, or 308 is aligned as illustrated by alignment arrows 372, 374, 376, and 378 that are directed away from aerial vehicle 300. In such an example, alignment arrows 372, 374, 376, and 378 may be directed approximately half-way along the respective horizontal angle of view so that a boundary (or "edge") of the field of view is substantially parallel with the corresponding edge of the aerial vehicle 300. For example, if a horizontal angle of view for an optical sensor is 110 degrees, the alignment of the optical sensor, as illustrated by the alignment arrow is located at approximately half of 110 degrees, or 55 degrees with respect to an edge of the aerial vehicle or the field of view. The edge of the aerial vehicle may be defined by a front, a side, or a rear of the perimeter frame, for example.

Still referring to FIG. 3, in this example, first optical sensor 302 is oriented such that it is aligned, as illustrated by alignment arrow 372, approximately 45 degrees from a reference direction 311. Second optical sensor 304 is oriented such that it is aligned, as illustrated by alignment arrow 374, approximately 135 degrees from the reference direction 311. Third optical sensor 306 is oriented such that it is aligned, as illustrated by alignment arrow 376, approximately 225 degrees with respect to the reference direction 311. Fourth optical sensor 308 is oriented such that it is aligned, as illustrated by alignment arrow 378, approximately 315 degrees from the reference direction 311.

The reference direction 311 may include any direction extending in a vertical plane. In some implementations, the reference direction 311 corresponds to a direction of travel or a forward direction traveled by the aerial vehicle 300 when airborne and moving towards a destination. In some implementations, the reference direction 311 may correspond to a direction of travel provided, at least in part, by a thrusting motor, such as the rear thrusting motor 110-2 shown in FIG. 1. In some implementations where the reference direction 311 corresponds to a direction of travel, as illustrated by the alignments arrows 372, 374, 376, and 378, the first optical sensor 302, the second optical sensor 304, the third optical sensor 306, and the fourth optical sensor 308 are offset with respect to a direction of travel. For example, none of the optical sensors 302, 304, 306, and 308 are aligned parallel with the reference direction 311.

In implementations that utilize a square shaped perimeter frame, for example, the first optical sensor 302 may be adjacent to the fourth optical sensor 308 and the second optical sensor 304. The second optical sensor 304 may be adjacent to the third optical sensor 306 and the first optical sensor 302. The third optical sensor 306 may be adjacent to the second optical sensor 304 and the fourth optical sensor 308. The fourth optical sensor 308 may be adjacent to the first optical sensor 302 and the third optical sensor 306.

The first optical sensor 302 and the third optical sensor 306 may not be adjacent to one another. The first optical sensor 302 may be the furthest of the optical sensors 302, 304, 306, and 308 from the third optical sensor 306, and vice versa. The second optical sensor 304 and the fourth optical sensor 308 may not be adjacent to one another. The second optical sensor 304 may be the furthest of optical sensors 302, 304, 306, and 308 from the fourth optical sensor 308, and vice versa. The first optical sensor 302 and the third optical sensor 306 may be located across the middle region 320 of the aerial vehicle 300 from one another, and the second optical sensor 304 and the fourth optical sensor 308 are located across the middle region 320 from one another.

Likewise, in some implementations, as illustrated by the alignment arrows 372 and 376, the first optical sensor 302 may be aligned in an opposite direction with respect to the third optical sensor 306. For example, the alignment of the first optical sensor 302 and the alignment of the third optical sensor 306 may be offset by approximately 180 degrees (or "opposite") with respect to one another. In a similar manner, as illustrated by alignment arrows 374 and 378, the alignment of the second optical sensor 304 may be opposite the alignment of the fourth optical sensor 308. As illustrated by alignment arrows 374 and 376, the alignment of the second optical sensor 304 and the alignment of the third optical sensor 306 may be offset by approximately 90 degrees with respect to one another. In a similar manner, as illustrated by alignment arrows 372, 374, 376, and 378, the alignments of the first optical sensor 302 and the second optical sensors 304 may be offset by approximately 90 degrees with respect to one another, the alignments of the second optical sensor 304 and the third optical sensor 306 may be offset by approximately 90 degrees with respect to one another, the third optical sensor 306 and the fourth optical sensor 308 may be offset by approximately 90 degrees with respect to one another, and the alignment of the fourth optical sensor 308 and the alignment of the first optical sensor 302 may be offset approximately ninety degrees with respect to one another.

By orienting and positioning each of the optical sensors as illustrated in FIG. 3, the signals provided by optical sensors 302, 304, 306, and 308 may be used to generate a scene representative of a continuous space that horizontally surrounds the perimeter frame of the aerial vehicle having fewer or smaller size blind spots and while using fewer optical sensors than prior art implementations. For example, the combined field of view 301 may include a 360-degree view around the vehicle.

Optical sensors having various fields of view may be used. While there should be some overlapping between adjacent fields of view to prevent gaps between the fields of view, excessive overlapping fields of view should be avoided. Using optical sensors with larger fields of view may lead to increased distortion and higher processing requirements. In some implementations, the first optical sensor 302 and the third optical sensor 306 are sized, configured, and/or oriented such that their respective fields of view do not overlap. Similarly, the second optical sensor 304 and the fourth optical sensor 308 may be sized, configured, and/or oriented such that their fields of view do not overlap. For example, the second optical sensor 304 and the fourth optical sensor 308 may be selected to have angles of view that are less than 120 degrees.

As illustrated in FIG. 3, the first optical sensor 302 may be oriented and positioned such that the first field of view 312 includes space substantially adjacent to the front 392 of the aerial vehicle 300. For example, the front 392 may include a flap, a wing, or a corner junction, such as the flap 127, the front wing 120, or one of corner junctions 130 as discussed above with respect to FIG. 1. Similarly, the second optical sensor 304 may be oriented and positioned such that the second field of view 314 includes space substantially adjacent to the first side 394 of the aerial vehicle 300. For example, the first side 394 may include a side rail or a corner junction, such as the side rail 130 or the corner junction 131 as discussed above with respect to FIG. 1. The third optical sensor 306 may be oriented and positioned such that the third field of view 316 includes space substantially adjacent to the rear 396 of the aerial vehicle 300. For example, the rear 396 may include a flap, a wing, or a corner junction, such as the upper rear wing 122, the lower rear wing 124, the flap 123, or one of corner junctions 130 as discussed above with respect to FIG. 1. The fourth optical sensor 308 may be oriented and positioned such that the fourth field of view 318 includes space substantially adjacent to the second side 398 of the aerial vehicle 300. For example, the second side 398 may include a side rail or a corner junction, such as a side rail 130 or a corner junction 131, as discussed above with FIG. 1.

As used herein, a field of view being "substantially adjacent" to a structure means that the field of view includes space that is 2 inches or less from at least a portion of the structure, or an edge of the field of view includes space that is less than 2 inches from at least a portion of the structure. For example, the first field of view 312 includes space that is substantially adjacent to the front 392 if the first field of view 312 includes space that is 1.5 inches from a wing of the front 392.

In some implementations, one or more of the optical sensors 302, 304, 306, and 308 are located and oriented such that their respective fields of view 312, 314, 316, and 318 include or overlap with a portion of the front 392, the first side 394, the second side 398, or the rear 396 of the aerial vehicle 300, respectively. For example, as illustrated in FIG. 3, the third optical sensor 306 is positioned and oriented such that the third field of view 316 overlaps with or includes a portion of the rear 396 of the aerial vehicle 300.

Various aerial vehicle configurations are possible. For example, a scene may be generated that is representative of a continuous space that vertically surrounds a perimeter frame of an aerial vehicle. For example, two sensors may be attached to a first winglet and two sensors may be attached to a second winglet. The winglets may be located opposite one another on the perimeter frame (front/back or opposite sides), and the sensors on each winglet may be vertically offset from one another. The field of view of each sensor overlaps with fields of view of two of the other sensors. Some or all of the overlapping fields have origins that are extended away vertically from the perimeter of the aerial vehicle, and a combined field of view of the fields of view of the plurality of sensors includes space that vertically surrounds the perimeter of the aerial vehicle.

Likewise, various aerial vehicle configurations may be utilized. For example, "octo-copter," octagon, or circular-shaped perimeter frames may be utilized. Different numbers of optical sensors may be utilized. In some implementations, five optical sensors may be coupled along a perimeter frame. In another example, an aerial vehicle may have a sensor at each of eight locations along a perimeter frame. In some implementations, eight sensors are arranged along a perimeter frame and the angle of view of each sensor is between 45 and 55 degrees.

In yet another example, an aerial vehicle may utilize six optical sensors located at locations (e.g., each corner) of a hexagon-shaped perimeter frame. In some implementations, a plurality of optical sensors may each be aligned vertically such that an alignment of each optical sensor is directed opposite (e.g., offset by approximately 180 degrees) an alignment of another optical sensor.

Figure 4:
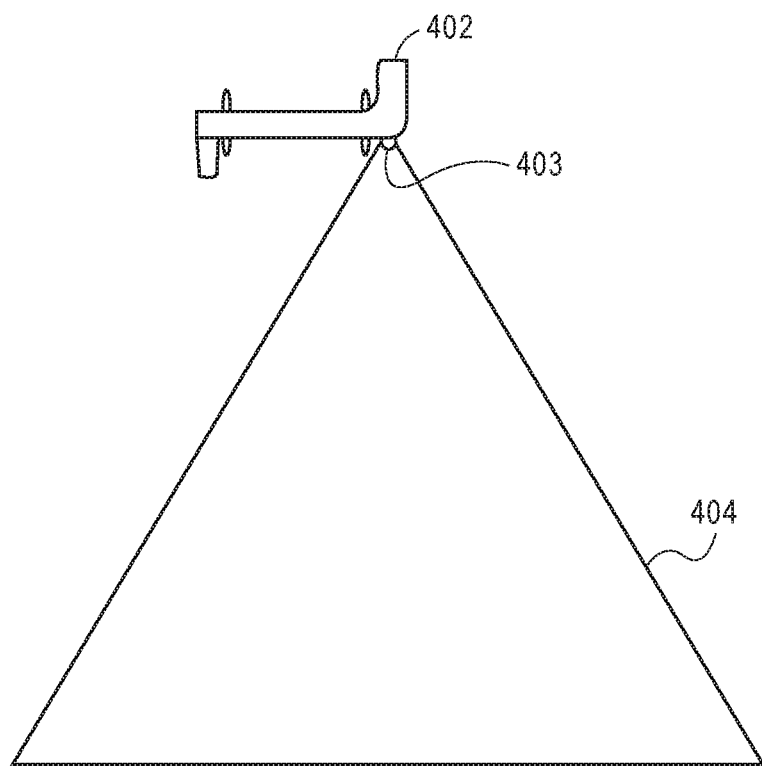
FIG. 4 depicts a side view of an aerial vehicle that includes an optical sensor with a field of view that extends into a space below the aerial vehicle, according to an implementation.

FIG. 4 shows an aerial vehicle 402 that has an optical sensor 403 that is oriented in a downward facing direction and a "vertical" field of view 404 that includes space below the aerial vehicle 402. Optical sensor 403 may be a stereo camera. In some implementations, a portion of the optical sensor 403 may be embedded in a cavity of a structure of the aerial vehicle and a portion may protrude from a surface of the structure. The optical sensor 403 may be included, for example, in the aerial vehicle 100 or the aerial vehicle 300 discussed above with respect to FIGS. 1 and 3, respectively. Providing the optical sensor 403 in combination with the optical sensors depicted in FIG. 1 or 3, may provide for a combined field of view in the horizontal and downward-facing vertical directions using as few as five cameras, which is fewer cameras than existing designs.

In some implementations, the aerial vehicle 402 includes an additional optical sensor that is oriented in an upward facing direction and a vertical field of view that includes space above the aerial vehicle 402. Such a configuration in combination with the optical sensors depicted in FIG. 1 or 3, may provide for a combined field of view that corresponds to space that horizontally and vertically surrounds the aerial vehicle using as few as six optical sensors.

In some implementations, a plurality of optical sensors may be coupled to the aerial vehicle 402 in a similar manner as discussed in connection with FIGS. 1 and 3, except they are arranged to provide a scene that is representative of a continuous space that vertically surrounds the aerial vehicle. For example, a boundary (or "edge of the field") of at least one field of view of the plurality of fields of view is substantially adjacent to a top, a bottom, and sides of the aerial vehicle. The four sensors may be oriented such that portions of fields of view of adjacent sensors overlap such that a combined or overall field of view include a continuous space that vertically surrounds the aerial vehicle. A scene that is representative of the continuous space that vertically surrounds the aerial vehicle may be generated from the four sensors.

Figure 5:
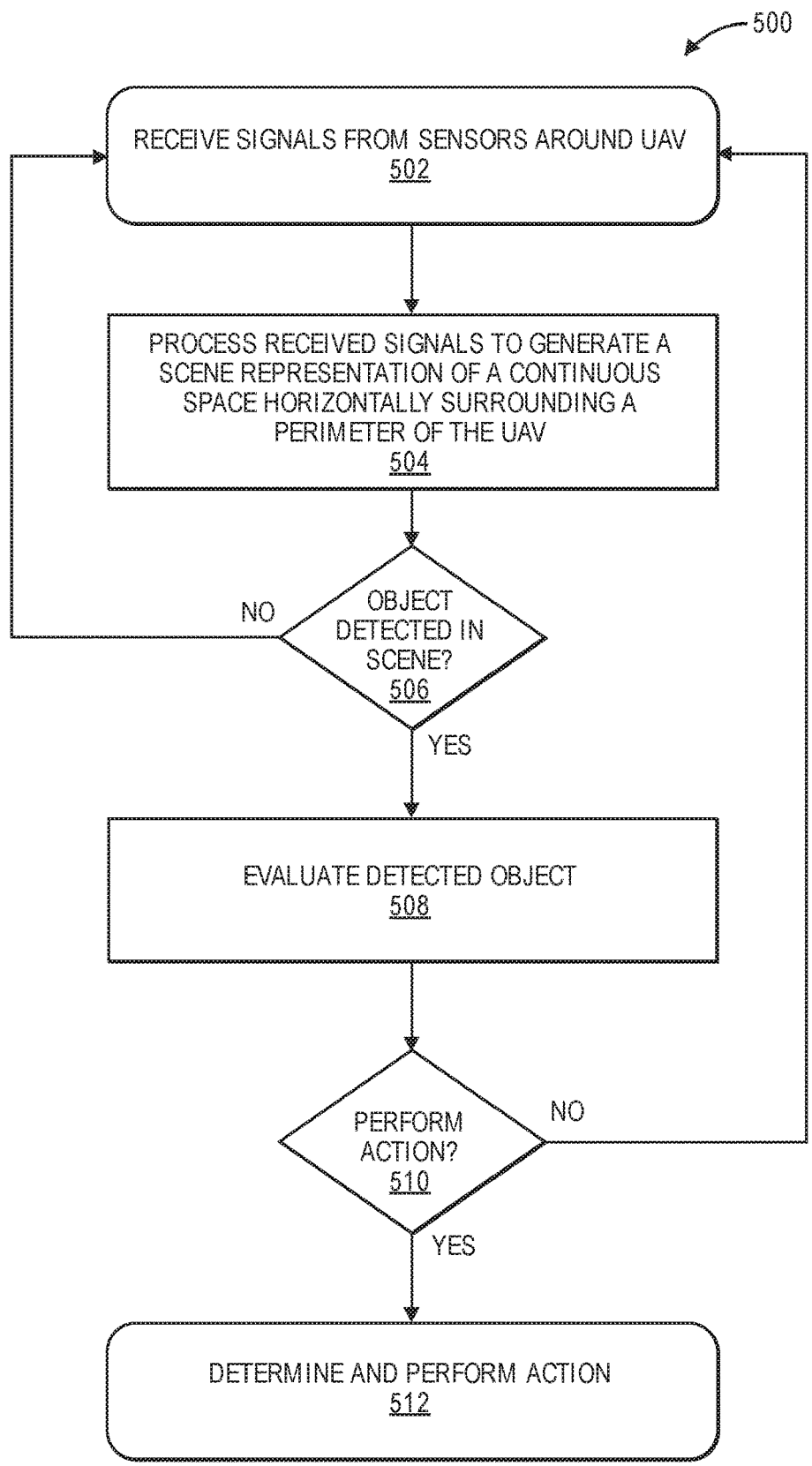
FIG. 5 is a flow diagram illustrating an example process for generating a scene representation of a continuous space horizontally surrounding an aerial vehicle, according to an implementation.

FIG. 5 is a flow diagram illustrating an example process for generating a scene representative of a continuous space that horizontally surrounds the perimeter frame, according to an implementation. The process of FIG. 5 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 receives signals from a plurality of optical sensors around an aerial vehicle, as in 502. For example, the aerial vehicle may be the aerial vehicle 100 depicted in FIG. 1 or the aerial vehicle 300 that is depicted in FIG. 3. In some implementations, signals may be received from four optical sensors. One or more of the four optical sensors may be a stereo camera, and signals from the four optical sensors may be images or may be used to generate images.

In some implementations, at least a portion of each of the optical sensors may be mounted to a perimeter frame of the aerial vehicle, to different winglets extending from the perimeter frame, and/or other structures that are coupled to the perimeter frame. Likewise, wired and/or wireless communications may couple each optical sensor to an aerial vehicle control system. Wired communications may be located in the winglets and/or the other structure of the aerial vehicle. The signals may pass from the optical sensors to the aerial vehicle control system via the wired and/or wireless communications such that the signals may be received from the optical sensors via the wired and/or wireless communications.

As discussed with respect to FIGS. 1, 2A, 2B, and 3, the fields of view of adjacent optical sensors may at least partially overlap such that the signals include information for a common space where the fields of view of adjacent optical sensors overlap. For example, referring back to FIG. 1, a first portion of a first signal from the first optical sensor 150 and a second portion of a second signal from a second optical sensor 151 represent a first same space with respect to the aerial vehicle 100. Similarly, a third portion of the second signal and a fourth portion of a third signal from the third optical sensor 152, represent a second same space with respect to the aerial vehicle, a fifth portion of the third signal and a sixth portion of a fourth signal from the fourth optical sensor 153 represent a third same space; and a seventh portion of the fourth signal and an eighth portion of the first signal represents a fourth same space.

At block 504, a scene that is representative of a continuous space that horizontally surrounds the perimeter frame of the aerial vehicle is generated by processing the signals from around the aerial vehicle. Various currently known or later developed image processing techniques may be used to generate the scene. In some implementation, image stitching may be used to generate the scene. The scene may be stored in a memory of an aerial vehicle control system and/or transmitted to a remote location, such as a remote computing resource.

In addition, or as an alternative to receiving signals from the plurality of optical sensors, SONAR, and/or other like components, may be used to detect a presence of an object within a distance of the aerial vehicle. In some implementations, rather than using images from stereo cameras, images from single lens cameras positioned around the aerial vehicle in a manner discussed above may be obtained and processed to generate a horizontal scene around the aerial vehicle and/or processed to determine a presence of a potential object. Pixel values may be compared between images to detect changes in view that may represent an object. In some implementations, if a potential object is detected, additional processing, using images from others optical sensors, etc., may be utilized to determine a presence of an object.

Based on the generated scene, a determination is made whether an object has been detected, as in 506. Objects may be detected using currently known object detection techniques, such as edge detection, shape detection, gray scale detection, or later developed techniques. If it is determined that an object has not been detected, the example process 500 returns to block 502 and continues.

At block 508, the detected object may be evaluated. Evaluating an object may involve determining at least one of a size, a shape, a type, a category, a velocity, an acceleration, a position, or a distance related to the detected object. The object may be evaluated, for example, by determining an approximate distance between the object and the aerial vehicle. For example, the generated scene may be compared with a known baseline to determine an approximate distance between the object and the aerial vehicle. The approximate distance between the object and the aerial vehicle may be monitored over time. In some examples, an object may be tracked. Such tracking of a detected object may repeat the blocks 502-506, receiving additional signals, processing those signals and detecting/tracking the object as the object moves. In some examples, a detected object is added to a map and the position of the object may be updated in the map. In other implementations, upon object detection, one or more characteristics of the object may be determined (e.g., size, shape, color) and additional signal from the imaging elements and/or optical sensors that detected the object may be processed to detect the determined characteristics about the object. Upon detection of those characteristics in subsequent signals, object tracking may be maintained with limited processing demand.

Based on the tracking, a determination is made whether to perform an action, as in block 510. An action may be determined to be performed if the approximate distance between the object and the aerial vehicle drops below a particular amount or the distance between the object and the aerial vehicle is decreasing more than a threshold level. If it is determined to not perform an action, the example process 500 returns to block 502 and continues.

At block 512, an action may be determined and performed. In some implementation, the action is determined based on tracking the object. For example, if an object is determined to be rapidly approaching the vehicle at about the same level of the vehicle, a command may be generated that causes the aerial vehicle to gain altitude (an action) such that the aerial vehicle maintains a safe distance from the object. In some implementations, an action is determined due to an object being detected that obstructs a planned path or landing area, and an action to adjust the flight path is performed. For example, if an object (e.g., a car) is determined to be at a planned landing zone, another landing zone may be determined and navigation of the aerial vehicle updated accordingly. It will be appreciated that any type of navigation, maneuver, ascend, descend, etc. performed by the aerial vehicle or updating a flight plan for the aerial vehicle may be considered an action performed as part of the example process 500.

While the examples discussed herein describe use of the implementations with an aerial vehicle, such as a UAV, it will be appreciated that the described implementations may likewise be used with other vehicles and/or in other scenarios. For example, a plurality of optical sensors may be positioned on another type of vehicle, such as a ground based and/or water based vehicle and an optical sensor selection controller utilized to select a combination of optical sensors, as discussed above.

Figure 6:
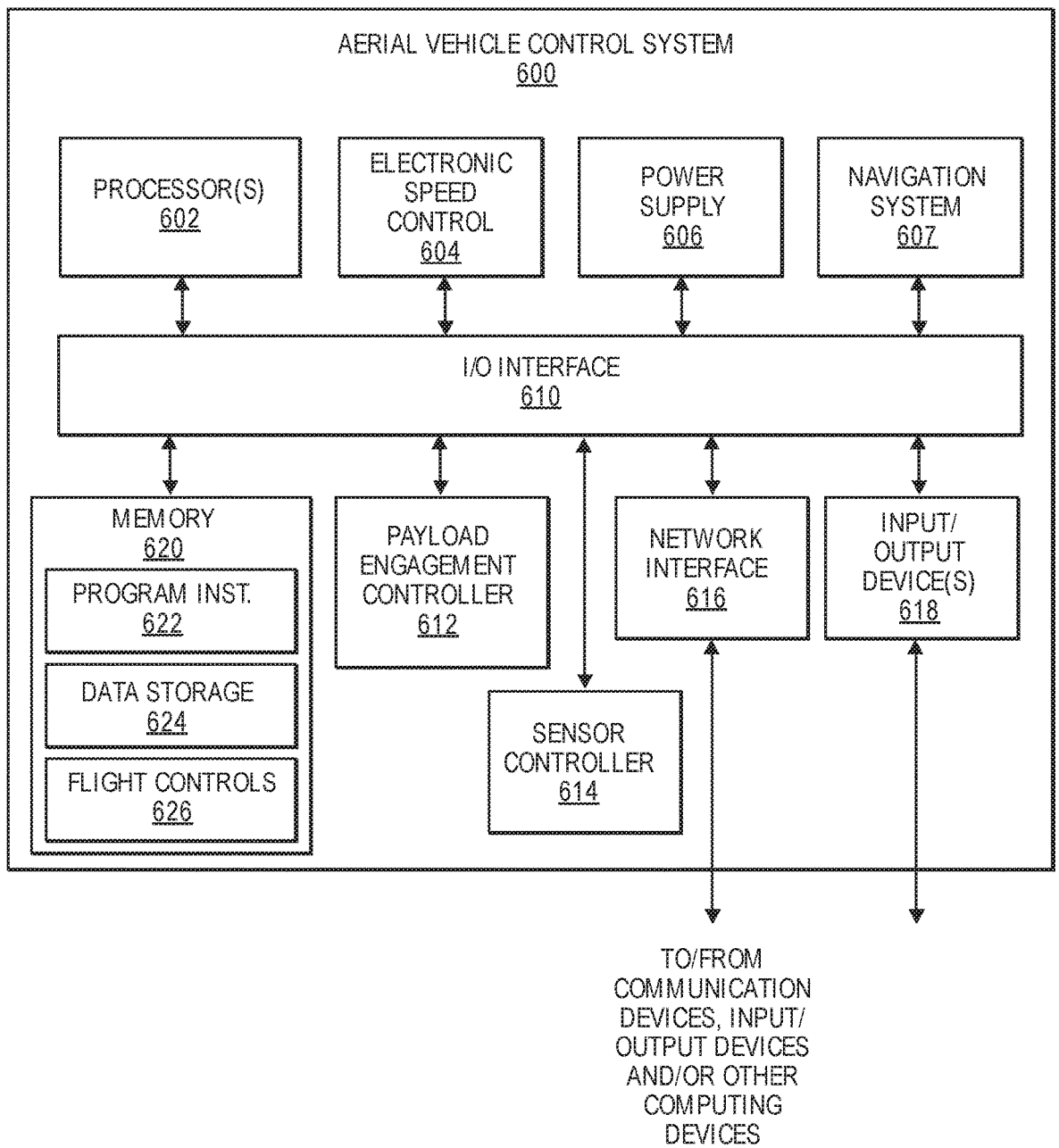
FIG. 6 is a block diagram of an illustrative implementation of an aerial vehicle control system that may be used with various implementations.

FIG. 6 is a block diagram illustrating an example aerial vehicle control system 600. In various examples, the block diagram may be illustrative of one or more aspects of the aerial vehicle control system 600 that may implement the systems and methods discussed and/or to control operation of the aerial vehicles described herein. In the illustrated implementation, the aerial vehicle control system 600 includes one or more processors 602, coupled to a memory, e.g., a non-transitory computer readable storage medium 620, via an input/output (I/O) interface 610. The aerial vehicle control system 600 may also include electronic speed controls 604 (ESCs), power supply modules 606, a navigation system 607, and/or a payload engagement controller 612. In some implementations, the navigation system

607 may include an inertial measurement unit (IMU). The aerial vehicle control system 600 may also include a network interface 616, and one or more input/output devices 618.

The aerial vehicle control system 600 may also include the optical sensor controller 614 that communicates with the plurality of optical sensors. The optical sensor controller 614 is communicatively coupled to the optical sensors via a wired or wireless coupling. In some implementations, the optical sensor controller 614 may receive signals (e.g. images) from the optical sensors. The optical sensor controller 614 may also control the optical sensors. For example, the optical sensor controller 614 may be configured to control a rate of operation (e.g., number of frames/second), shutter speed, and/or a focus of the optical sensors. In some implementations, the optical sensor controller 614 may control image stabilizing mechanisms coupled to or incorporated into the optical sensors. In some implementations, the optical sensor controller 614 may be able to process (e.g. filter) signals or images provided by the optical sensors.

In implementations that utilize LIDAR, for example, the optical sensor controller 614 may be configured to control characteristics of light that is used to illuminate a target space. For example, the optical sensor controller 614 may be configured to control the intensity or frequency of the emitted light and/or the rate of the scanning the received light. For example, optical sensor controller 614 may cause the intensity of the emitted light to be greater when the vehicle is traveling close to the ground where objects are more likely to be present.

In various implementations, the aerial vehicle control system 600 may include a uniprocessor system including one processor 602, or a multiprocessor system including more than one processor 602 (e.g., two, four, eight, or another suitable number). The processor(s) 602 may be any suitable processor capable of executing instructions. For example, in various implementations, the processor(s) 602 may be general-purpose or embedded processors implementing any of many instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, flight paths, flight control parameters, and/or data items accessible by the processor(s) 602. Data items may include, for example, images obtained from one or more of the optical sensors, distance information, combined image information (e.g., depth information), etc.

In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624 and flight controls 626, respectively. In other implementations, program instructions, data, and/or flight controls may be received, sent, or stored upon different types of computer-accessible media, such as non-transitory media, or on similar media separate from the non-transitory computer readable storage medium 620 or the aerial vehicle control system 600.

Generally, a non-transitory, computer readable storage medium may include storage media or memory media such as magnetic or optical media, e.g., disk or CD/DVD-ROM, coupled to the aerial vehicle control system 600 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The ESCs 604 communicate with the navigation system 607 and adjust the rotational speed of each lifting motor and/or the thrusting motor to stabilize the UAV and guide the UAV along a determined flight path. The navigation system 607 may include a GPS, indoor positioning system (IPS), IMU or other similar systems and/or sensors that can navigate the aerial vehicle 100 to and/or from a location. The payload engagement controller 612 communicates with actuator(s) or motor(s) (e.g., a servo motor) used to engage and/or disengage items.

The network interface 616 may be configured to allow data to be exchanged between the aerial vehicle control system 600, other devices attached to a network, such as other computer systems (e.g., remote computing resources), and/or with aerial vehicle control systems of other UAVs. For example, the network interface 616 may enable wireless communication between the UAV that includes the control system 600 and an aerial vehicle control system that is implemented on one or more remote computing resources. For wireless communication, an antenna of an UAV or other communication components may be utilized. As another example, the network interface 616 may enable wireless communication between numerous UAVs. In various implementations, the network interface 616 may support communication via wireless general data networks, such as a Wi-Fi network. For example, the network interface 616 may support communication via telecommunications networks, such as cellular communication networks, satellite networks.

Input/output devices 618 may, in some implementations, include one or more displays, imaging devices, thermal sensors, infrared sensors, time of flight sensors, accelerometers, pressure sensors, weather sensors, optical sensors (e.g., cameras), gimbals, landing gear, etc. Multiple input/output devices 618 may be present and controlled by the aerial vehicle control system 600. One or more of these sensors may be utilized to assist in landing as well as to avoid obstacles during flight.

As shown in FIG. 6, the memory may include program instructions 622, which may be configured to implement the example routines and/or sub-routines described herein. The data storage 624 may include various data stores for maintaining data items that may be provided for determining flight paths, landing, identifying locations for disengaging items, engaging/disengaging the thrusting motors, selecting a combination of optical sensors for stereo imaging, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 600 is merely illustrative and is not intended to limit the present disclosure. In particular, the computing system and devices may include any combination of hardware or software that can perform the indicated functions. The aerial vehicle control system 600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. In other implementations, some or all of the software components may execute in memory on another device and communicate with the illustrated aerial vehicle control system 600. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 600 may be transmitted to the aerial vehicle control system 600 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not limited to the specific features or acts described. Rather, the specific features and acts are disclosed as exemplary forms of implementing the claims.

What is claimed is:

1. An aerial vehicle apparatus, comprising:
a frame;
a first sensor coupled to the frame, the first sensor having a first field of view and oriented such that the first field of view extends in a first substantially horizontal direction from the frame;
a second sensor coupled to the frame, the second sensor having a second field of view and oriented such that the second field of view extends in a second substantially horizontal direction from the frame;
a third sensor coupled to the frame, the third sensor having a third field of view and oriented such that the third field of view extends in a third substantially horizontal direction from the frame;
a fourth sensor coupled to the frame, the fourth sensor having a fourth field of view and oriented such that the fourth field of view extends in a fourth substantially horizontal direction from the frame;
a fifth sensor coupled to the frame, the fifth sensor having a fifth field of view and oriented such that the fifth field of view extends in a first substantially vertical upward direction from the frame;
a sixth sensor coupled to the frame, the sixth sensor having a sixth field of view and oriented such that the sixth field of view extends in a second substantially vertical downward direction from the frame; and
wherein image data from at least the first sensor, the second sensor, the third sensor, the fourth sensor, the fifth sensor, and the sixth sensor forms a scene that represents a continuous space that surrounds the aerial vehicle apparatus.

2. The aerial vehicle apparatus of claim 1, wherein:
the first sensor and the second sensor are positioned such that at least a first portion of the first field of view and a second portion of the second field of view overlap;
the second sensor and the third sensor are positioned such that at least a third portion of the second field of view and a fourth portion of the third field of view overlap;
the third sensor and the fourth sensor are positioned such that at least a fifth portion of the third field of view and a sixth portion of the fourth field of view overlap; and
the fourth sensor and the first sensor are positioned such that at least a seventh portion of the fourth field of view and an eighth portion of the first field of view overlap.

3. The aerial vehicle apparatus of claim 1, wherein:
the fifth sensor is positioned such that at least a portion of the fifth field of view at least partially overlaps with at least one of the first field of view, the second field of view, the third field of view, or the fourth field of view.

4. The aerial vehicle apparatus of claim 3, wherein:
the sixth sensor is positioned such that at least a portion of the sixth field of view at least partially overlaps with at least one of the first field of view, the second field of view, the third field of view, or the fourth field of view.

5. An aerial vehicle apparatus, comprising:
a first sensor having a first field of view, the first sensor coupled to the aerial vehicle apparatus and oriented such that a boundary of the first field of view extends substantially parallel with a first edge of the aerial vehicle apparatus;
a second sensor having a second field of view, the second sensor coupled to the aerial vehicle apparatus and oriented such that the second field of view extends substantially along a second portion of the aerial vehicle apparatus;
a third sensor having a third field of view, the third sensor coupled to the aerial vehicle apparatus and oriented such that the third field of view extends substantially along a third portion of the aerial vehicle apparatus; and a fourth sensor having a fourth field of view, the fourth sensor coupled to the aerial vehicle apparatus and oriented such that the fourth field of view extends substantially along a fourth portion of the aerial vehicle apparatus; and wherein sensor data from at least the first sensor, the second sensor, the third sensor, and the fourth sensor forms a scene that represents a continuous space that surrounds at least a portion of the aerial vehicle apparatus.

6. The aerial vehicle apparatus of claim 5, further comprising:
a fifth sensor having a fifth field of view, the fifth sensor coupled to the aerial vehicle apparatus and oriented such that the fifth field of view extends in a vertical direction with respect to the aerial vehicle apparatus.

7. The aerial vehicle apparatus of claim 5, wherein:
at least a first portion of the first field of view and at least a second portion of the second field of view overlap;
at least a third portion of the second field of view and at least a fourth portion of the third field of view overlap;
at least a fifth portion of the third field of view and at least a sixth portion of the fourth field of view overlap; and
at least a seventh portion of the fourth field of view and an eighth portion of the first field of view overlap.

8. The aerial vehicle apparatus of claim 5, further comprising:
a propulsion device configured to selectively move the aerial vehicle apparatus in a direction of travel, wherein the first sensor is positioned such that an alignment of the first field of view extends in a direction that is offset from a horizontal direction of travel.

9. The aerial vehicle apparatus of claim 5, wherein:
the first sensor includes a first stereo camera;
the second sensor includes a second stereo camera;
the third sensor includes a third stereo camera; and
the fourth sensor includes a fourth stereo camera.

10. The aerial vehicle apparatus of claim 5, wherein the first sensor includes at least a first imaging element and a second imaging element that form a stereo camera.

11. The aerial vehicle apparatus of claim 10, wherein the first imaging element and the second imaging element are vertically offset from one another with respect to the aerial vehicle apparatus.

12. The aerial vehicle apparatus of claim 10, wherein the first imaging element and the second imaging element are horizontally offset from one another with respect to the aerial vehicle apparatus.

13. The aerial vehicle apparatus of claim 5, further comprising:
a frame having a first outer surface and a second outer surface; and
wherein:
at least a portion of the first field of view overlaps with the first outer surface; and
at least a portion of the second field of view overlaps with the second outer surface.

14. The aerial vehicle apparatus of claim 5, further comprising:
a frame having at least a lower portion and an upper portion; and
wherein:
the first sensor and the second sensor are coupled to the lower portion; and
the third sensor and the fourth sensor are coupled to the upper portion.

15. The aerial vehicle apparatus of claim 5, further comprising:
a processing component configured to at least:
receive first image data from the first sensor;
receive second image data from the second sensor;
receive third image data from the third sensor;
receive fourth image data from the fourth sensor; and
process the first image data, the second image data, the third image data, and the fourth image data to form a representation of the scene.

16. The aerial vehicle apparatus of claim 5, further comprising:
a fifth sensor coupled to the aerial vehicle apparatus and oriented such that the fifth sensor has a fifth field of view representative of a first vertical space below the aerial vehicle apparatus; and
a sixth sensor coupled to the aerial vehicle apparatus and oriented such that the sixth sensor has a sixth field of view representative of a second vertical space above the aerial vehicle apparatus.

17. A computer-implemented method, comprising:
receiving a first signal from a first sensor coupled at a first position on an aerial vehicle and oriented such that a boundary of a first field of view of the first sensor extends substantially parallel with a first edge of the aerial vehicle;
receiving a second signal from a second sensor coupled at a second position on the aerial vehicle and oriented such that a second field of view of the second sensor extends substantially along a second portion of the aerial vehicle;
receiving a third signal from a third sensor coupled at a third position on the aerial vehicle and oriented such that a third field of view of the third sensor extends substantially along a third portion of the aerial vehicle;
receiving a fourth signal from a fourth sensor coupled at a fourth position on the aerial vehicle and oriented such that a fourth field of view of the fourth sensor extends substantially along a fourth portion of the aerial vehicle; and
processing the first signal, the second signal, the third signal, and the fourth signal to generate a scene that represents a space surrounding the aerial vehicle.

18. The computer-implemented method of claim 17, wherein:
the first sensor comprises a first stereo camera;
the second sensor comprises a second stereo camera;
the third sensor comprises a third stereo camera; and
the fourth sensor comprises a fourth stereo camera.

19. The computer-implemented method of claim 17, wherein:
a first portion of the first signal and a second portion of the second signal at least partially overlap;
a third portion of the second signal and a fourth portion of the third signal at least partially overlap;
a fifth portion of the third signal and a sixth portion of the fourth signal at least partially overlap; and
a seventh portion of the fourth signal and an eighth portion of the first signal at least partially overlap.

20. The computer-implemented method of claim 17, further comprising:
receiving a fifth signal from a fifth sensor coupled at a fifth position on the aerial vehicle and oriented such that a fifth field of view of the fifth sensor extends substantially in a vertical direction with respect to the aerial vehicle; and processing the first signal, the second signal, the third signal, the fourth signal, and the fifth signal to generate the scene.

21. The aerial vehicle apparatus of claim 5, wherein the first sensor, the second sensor, the third sensor, and the fourth sensor are arranged in an asymmetrical orientation about the aerial vehicle.

22. The aerial vehicle apparatus of claim 5, wherein an alignment of the first field of view is oriented at an angle relative to the corresponding first edge that is approximately half a horizontal angle of view for the first sensor.

23. The aerial vehicle apparatus of claim 5, wherein:
the second sensor is oriented such that an edge of the second field of view extends substantially parallel with a corresponding second edge of the aerial vehicle apparatus,
the third sensor is oriented such that an edge of the third field of view extends substantially parallel with a corresponding third edge of the aerial vehicle apparatus, and
the fourth sensor is oriented such that an edge of the fourth field of view extends substantially parallel with a corresponding fourth edge of the aerial vehicle apparatus.

* * * * *